United States Patent [19]

Ciobanu et al.

[11] 4,248,923

[45] Feb. 3, 1981

[54] MULTILAYER BONDED FABRIC AND METHOD OF AND APPARATUS FOR MAKING SAME

[75] Inventors: Pia Ciobanu; Ioan Pop; Grigore Virlan, all of Bucharest, Romania

[73] Assignee: Institutul de Cercetari Textile, Bucharest, Romania

[21] Appl. No.: 968,861

[22] Filed: Dec. 12, 1978

[30] Foreign Application Priority Data

Dec. 19, 1977 [RO] Romania .................................. 92520

[51] Int. Cl.³ ............................................. B32B 3/00
[52] U.S. Cl. .................................. 428/197; 128/425; 156/184; 156/290; 156/291; 156/498; 428/195; 428/198; 428/219; 428/234; 428/240; 428/246; 428/253; 428/300; 428/327
[58] Field of Search ............... 428/195, 196, 197, 198, 428/240, 246, 252, 253, 283, 327, 234, 300; 156/290, 291, 184, 498; 128/425

[56] References Cited

U.S. PATENT DOCUMENTS

| 2,773,791 | 12/1956 | Maciver | 428/246 |
| 3,682,738 | 8/1972 | Smith | 156/291 |
| 3,937,859 | 2/1976 | Carra et al. | 428/198 |
| 4,139,613 | 2/1979 | Hefele | 156/291 |
| 4,143,424 | 3/1979 | Knoke et al. | 428/198 |
| 4,159,360 | 6/1979 | Kim | 428/198 |

*Primary Examiner*—James J. Bell
*Attorney, Agent, or Firm*—Karl F. Ross

[57] ABSTRACT

A bonded fabric, especially for women's underwear, is formed by coating a binder powder onto the surface of a first polyamide knit layer and fritting the binder powder thereon before applying to it a needled polyester layer which in turn is bonded by a second binder layer to a second knit polyamide. A third binder layer bonds a knitted lace to the second polyamide layer which is identical to the first.

11 Claims, 8 Drawing Figures

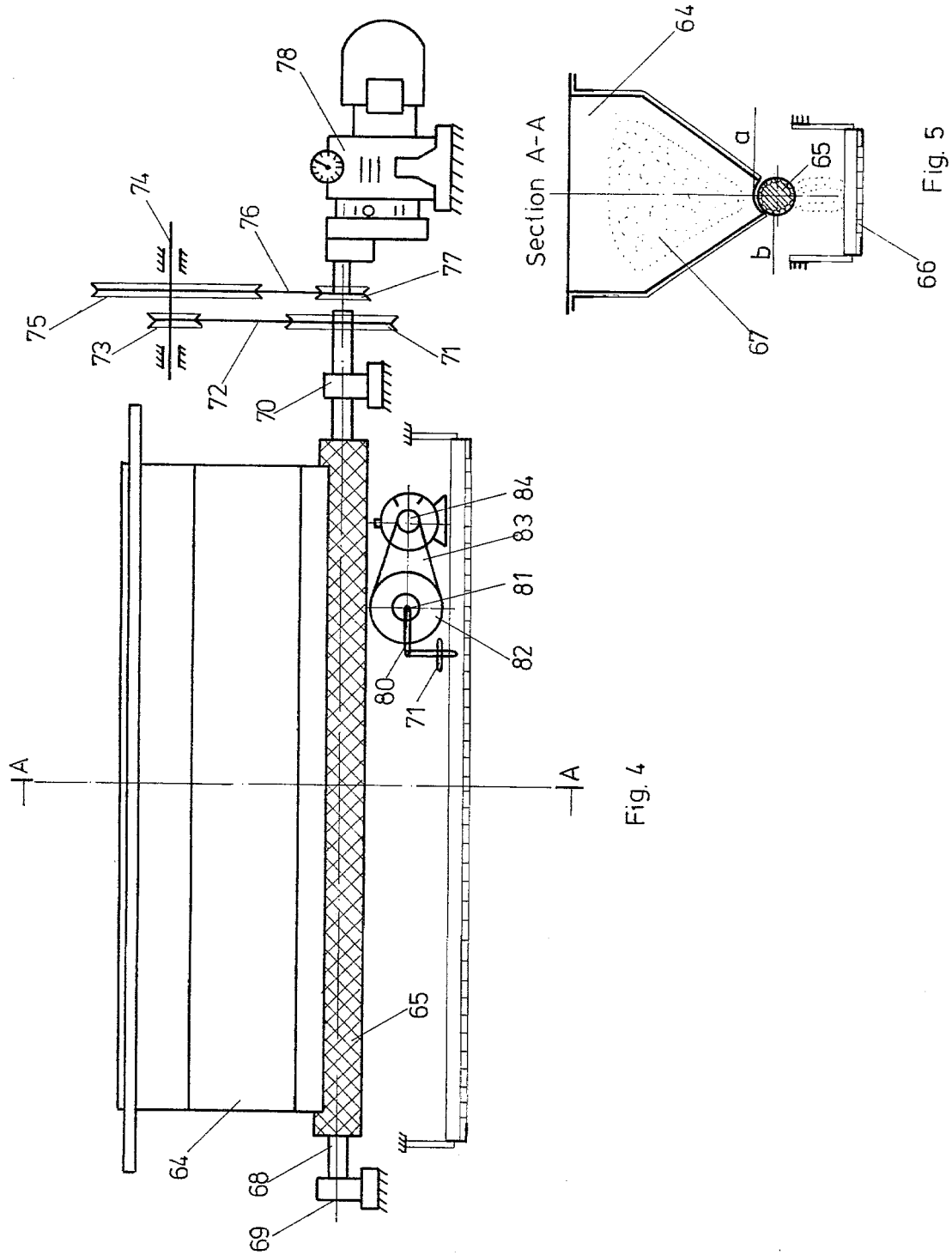

MULTILAYER BONDED FABRIC AND METHOD OF AND APPARATUS FOR MAKING SAME

FIELD OF THE INVENTION

The present invention relates to a multilayer bonded fabric and to a method of and an apparatus for making same. More particularly, the invention relates to a bonded fabric for use in women's underwear and, especially for brassieres.

BACKGROUND OF THE INVENTION

A bonded fabric is described in German Pat. No. 1,771,516 which is made by depositing a pulverulent binder upon the upper surface of a sheet of material with the two layers then being passed through a fritting chamber in which the loose powder is transformed into a fritted layer attached to a substrate. A second fabric layer is then applied to the fritted powder layer and the assembly is passed between a pair of calendering rolls to produce a bonded fabric.

The disadvantage of this system is that the resulting fabric has only two layers which limits the versatility of the technique.

OBJECT OF THE INVENTION

It is the object of the present invention to provide a multilayer bonded fabric of improved fullness and esthetic appearance.

SUMMARY OF THE INVENTION

This object and others which will become apparent hereinafter are attained, in accordance with the present invention, in a multilayer bonded textile product which has been found to be especially suitable for use in the making of women's underwear, especially brassieres, and which comprises a first polyamide knit fabric layer, a first binder layer overlying the first polyamide knit layer and bonding the same to a second, needled polyester fabric layer which, in turn, is bonded by the second binder layer to a third fabric layer in the form of a polyamide knit identical to the first layer. A fourth fabric layer, composed of lace knitted from synthetic fibers, is applied by a third binder layer to the third fabric layer. According to a feature of the invention, the first and third knitted-fabric layers, composed of polyamide, have a weight per unit area of 30 to 50 g/m$^2$ while each of the binder layers is composed of binder granules having a particle size of 80 to 400 microns deposited in a quantity of 10 to 18 g/m$^2$. The binder is advantageously a polyamide, polyester or polyethylene copolymer.

The nonwoven (needled) polyester layer has a weight per unit area of 70 to 130 g/m$^2$ while the corresponding dimension of the knitted lace is 50 to 90 g/m$^2$. The knitted lace is a polyamide, viscose or polyamide/viscose yarn product.

According to a feature of the invention in the method aspect thereof, the multilayer bonded product is obtained by passing the knit layers and the nonwoven needled fabric layer below a device of metering the pulverulent binder on the respective surface whereupon each binder layer is carried by the respective substrate through a fritting chamber in which the binder layer is subjected to a temperature corresponding substantially to the melting temperature thereof. The binder-carrying face of the first knit layer is then brought into contact with the uncoated surface of the nonwoven needled fabric and the resulting intermediate composite is pressed between two heated moving surfaces to effect bonding between the nonwoven needled layer and the first knit layer via the first binder layer.

The exposed binder layer of this composite is then brought into contact with the uncoated face of the third fabric layer, namely, the second polyamide knit, with the resulting assembly being again passed between two heated surfaces to form a second intermediate product. The knitted lace is then brought into contact with the binder-carrying surface of the second intermediate composite and the assembly pressed between two heated moving surfaces to form the end product. The latter is passed over a cooling element and coiled on a carrying roller.

The fabric can be produced at a speed of 50 to 15 meters per minute with the temperature of the heated surface being between 60° and 150° C. while the cooling surface is at a temperature of 10° to 20° C.

The initial cooling stage can be followed by a second stage in which the bonded fabric is brought into contact with a surface having a temperature significantly below that of the first surface, preferably between −5° and −10° C.

The apparatus of the present invention comprises means for depositing or spreading the pulverulent binder onto the fabric layers, conveyor means for transporting the fabric layers beneath the spreader, fritting means for bonding the binder layer to the fabric layer, a pressing means formed by calendering rolls, and cooling means, as well as a coiling unit.

The spreading means comprises a plurality of discharge shafts each provided with a guiding roller system and associated with a conveyor belt. Above each conveyor belt a spreader for pulverulent material is provided and below each discharge conveyor there is disposed a fritting conveyor belt which carries the layer coated with the binder through the fritting chamber.

The pressing device is a hollow pressing roll into which a hot fluid is fed and which has an elastic surface.

The fritting chamber is provided with heating means which can be infrared radiation sources or heating tubes traversed by a hot fluid.

The cooling means can comprise hollow rolls through which a coolant is passed, a drum cooler being provided downstream of the latter rolls and communicates with a second source of the fluid and over which two gluing rollers are provided.

A discharging subassembly can be provided for the pulverulent material with roller formed with grooves adapted to carry the pulverulent material outwardly from the center to the edges of the fabric layer.

The spreader for the pulverulent material can have a tapered chute which is formed over the full length of its lower end with a discharge slot in contact with a feed shaft.

Below the latter is provided a screen with a mechanism for reciprocating same. The periphery of the shaft is formed with feed channels which extend in a coiled pattern in both axial directions.

BRIEF DESCRIPTION OF THE DRAWING

FIG. 4 is a front view of a subassembly for depositing the pulverulent binder;

FIG. 5 is a cross-sectional view taken along the line A—A of FIG. 4;

SPECIFIC DESCRIPTION

Figure 1:
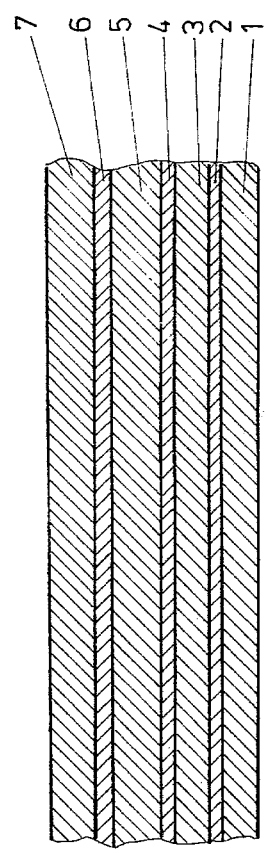
FIG. 1 is a cross-sectional view of a product made in accordance with the principles of the present invention.

The multilayer fabric shown in FIG. 1 comprises a polyamide knit 1 adhering by a binder layer 2 to a nonwoven needled fabric 3 of cotton-type polyester. This fabric layer adheres by a second binder layer 4 to a second polyamide knit 5 identical with the first and bonded by a third binder layer 6 to a layer 7 of lace knitted from synthetic fibers. The weight per unit area of the knits 1 and 5 is 30 to 50 g/m$^2$ while that of the nonwoven needled fabric 3 is 70 to 130 g/m$^2$ and the weight per unit area of the knitted lace is 40 to 90 g/m$^2$.

The binder layers 2, 4 and 6 are each composed of granules of a polyamide, polyester or polyethylene copolymer having a particle size of 80 to 400 microns and deposited in a layer of 10 to 18 g/m$^2$.

The knitted lace is composed of polyamide yarns, viscose yarns or polyamide/viscose yarns.

The fabric shown in FIG. 1 is used in the manufacture of women's undergarments, for example brassieres, by cutting the sheet into pieces of the requisite size and shape and then assembling the pieces by conventional techniques.

Figure 2:
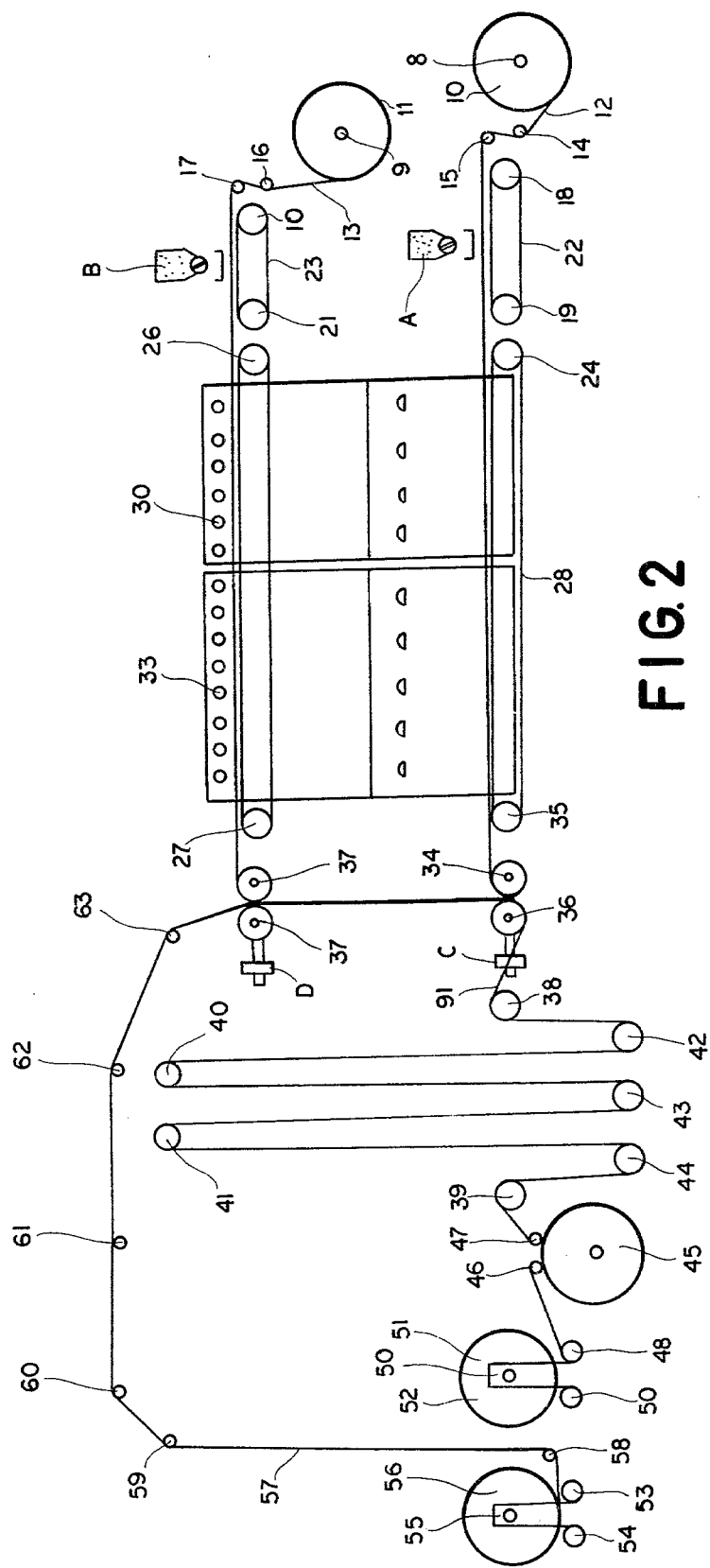
FIG. 2 is a diagrammatic side-elevational view of an apparatus for making this product.

From FIG. 2 it can be seen that the composite fabric of FIG. 1 can be formed by feeding the first polyamide knit 12 and the nonwoven needled polyester fabric 13 from respective coils 10 and 11 on feeding shafts 8 and 9 around guide rollers 14, 15 and 16, 17, respectively, past feeders A and B for the pulverulent binder, the respective fabric layers being supported by conveyor belts 22 and 23 guided over rollers 18, 19 and 20, 21, respectively.

The fabric layers, thus coated with the layers of pulverulent binder, are carried through a fritting chamber 30 on respective fritting belts 28 and 29, the former being guided over rollers 24 and 25 while the latter is guided over rollers 26 and 27.

The fritting chamber is provided with two zones separated from each other by a horizontal wall 31 and receiving the respective belts. Above the belt 29 there are provided heating tubes 33 traversed by a heating fluid while above the belt 28 there are provided radial infrared heaters 22.

From the fritting chamber, the fabric layers to which the binder layers have been bonded, are passed through respective subassemblies in the form of calendering rolls, one pair of which is represented at 37 while the other pair is shown at 34, 36. One roller of each of these calendering assemblies is formed with an elastic surface and can be pressed by a pressure device C or D against the other.

From a coil 56, a third fabric layer is withdrawn as represented at 57, this coil having a shaft 55. The layer 57 is fed by feed rollers 53 and 54 over a stretching or tensioning roller 58 which has helical grooves running from the center to the ends to spread out the fabric and tension it along its width. This layer passes over guide rollers 59–63 to meet the binder-coated surface of the layer 13 at the calendering rollers 37, the composite thus formed meeting the binder coated layer 12 at the calendering rolls 34, 36. Naturally, when four fabric layers are provided, a third binder-coated layer is fed in similar fashion through the fritting chamber and to a pair of calendering rolls to meet the remainder of the assembly.

The multilayer composite is led at 91 over cooling rollers 38, 42, 40, 43, 41 and 44 before passing over another cooling drum. The cooling rollers 40, 41, 42, 43, 44 are hollow and are connected with a source of a first cooling fluid. The hollow cooling drum 44 is connected to a second source of cooling fluid at a temperature lower than that of the first fluid. The cooled product is then fed by rollers 48 and 50 into a coil 52 supported by a shaft 51 on a vertical member 50. Roller 63 is a stretching roller identical to roller 58.

Figure 3:
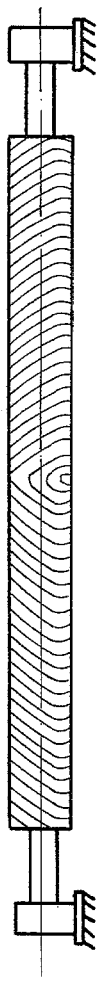
FIG. 3 is an elevational view of a tension roller used in this apparatus.

The stretching rollers have been represented in FIG. 3 from which the helical grooves running from the center outwardly can be discerned.

Each delivery assembly for the pulverulent binder, represented at A and B, has a tapered hopper disposed across the path of the respective fabric and provided at its lower end over its full length with a slot a disposed above a feeding shaft 65 which is in contact with the walls of the hopper. This shaft is formed with helical grooves b in the shape of a spiral extending over the full surface in both directions. The shaft 65 is supported at 68 in bearings 69, 70 and has a pulley 71 connected by a belt 72 to an intermediate pulley 73 on a shaft 74 driven by a motor 78 whose pulley 77 is connected by another belt 76 to a further intermediate pulley 75 connected to shaft 74.

Below the shaft 65 there is mounted a movable screen 66 and a polyester binder is stored at 67 in the hopper.

Screen 66 is connected to an arm 79 articulated eccentrically at 80 to a crank whose crank shaft 81 is driven by a wheel 82 coupled by belt 83 to the drive wheel of a motor. Thus, with rotation of the shaft 65 and reciprocation of the screen, a layer of binder granules is deposited uniformly on the fabric layer.

Figure 6:
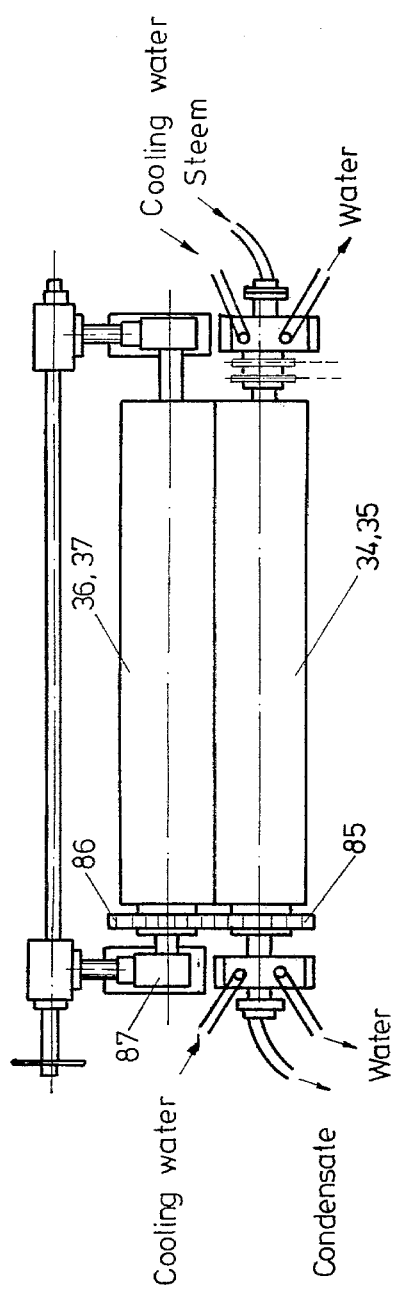
FIG. 6 is a top view of the pressing subassembly.
Figure 8:
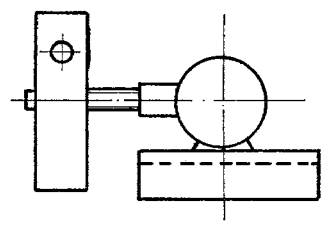
FIG. 8 is a detailed side view of the portion shown in FIG. 7.
Figure 7:
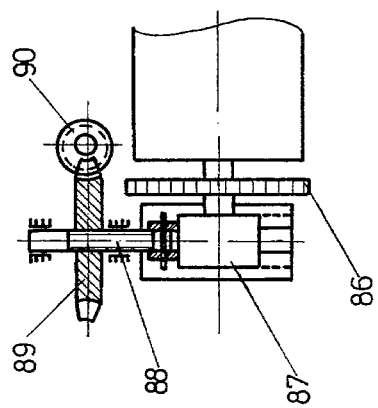
FIG. 7 is a detailed view, partially in section, of the pressing assembly.

As can be seen from FIG. 6, each pressing assembly can include a pressing roller 34 or 35 connected by a chain transmission to a drive source and provided with a gear 85 meshing with a gear 86 connected to the corresponding pressing roller 36 or 37. Each pressing roller 36 or 37 is provided with a lateral bearing 87 (FIG. 7) which can be driven by a threaded shaft radially to increase or decrease the pressure on the fabric layers passed between the rolls. A worm wheel 89 drives the screw 88 in its guides and meshes in turn with a worm 90.

Figure 9:
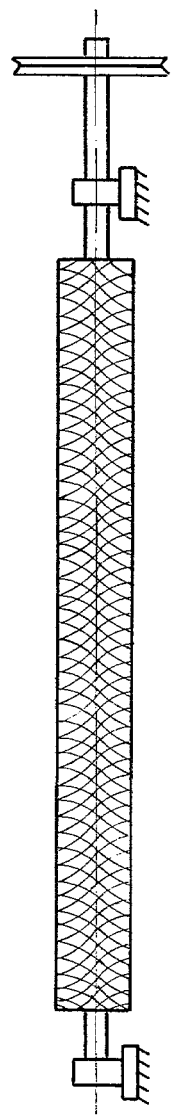
FIG. 9 is an elevational view of the binder discharge shaft.

A particularly effective configuration of the grooves on the shaft 65 has been shown in FIG. 9.

Using the apparatus as described, the first polyamide knit layer, the needled polyester layer and the second polyamide knit layer are each provided with a fritted binder coating and are pressed together in stages and with the knitted lace to form the composite. The calendering rolls effect bonding at the requisite temperature and pressure.

We claim:

1. A multilayer bonded textile composite comprising a first polyamide knit layer, a first binder layer bonded to said first polyamide knit layer, a needled nonwoven polyester layer bonded to said first polyamide knit layer by said first binder layer, a second binder layer bonded to said nonwoven needled polyester layer, a second polyamide knit layer identical to said first polyamide knit layer and bonded by said second binder layer to said nonwoven needled polyester layer, a third binder layer bonded to said second polyamide knit layer, and a lace layer bonded to said second polyamide knit layer by said third binder layer.

2. The composite defined in claim 1 wherein:

said first and second polyamide knit layers each have a weight per unit area of 30 to 50 g/m$^2$;

said binder layers are each composed of binder granules containing polyamide, polyester or polyethylene and of particle size between 80 and 400 deposited in a layer of 10 to 18 g/m$^2$;

the weight per unit area of the nonwoven needled polyester layer is 70 to 130 g/m$^2$;

the weight per unit area of the knitted lace is 40 to 90 g/m$^2$; and the lace is composed of polyamide, viscose or polyamide/viscose yarn.

3. The composite defined in claim 2 wherein said binder contains two to 8% N dibutylmaleate or 40% dimethyladipate.

4. A method of making the composite defined in claim 1 wherein:

each of said first knitted layer, said nonwoven needled polyester layer and said second knitted layer is provided with the respective binder layer by depositing particles of the binder uniformly over a surface thereof and passing the binder-particle coated layer through a sintering chamber wherein the binder particles are fused to the surface upon which they were deposited;

the binder-coated surface of said first layer is pressed against the uncoated surface of said nonwoven needled polyester layer, the binder-coated surface is pressed against the uncoated surface of said second knitted layer and said lace layer is pressed against the binder-coated surface of said second knitted layer under heat and pressure sufficient to effect bonding of said layers together;

the resulting composite is cooled; and the cooled composite is wound in a coil.

5. The method defined in claim 4 wherein said layers are advanced at a speed of 5 to 15 meters per minute through the steps and bonding is effected between moving surfaces heated to a temperature of 60° to 150° C. while cooling is effected by bringing the composite into contact with a surface at a temperature of 10° to 20° C.

6. The method defined in claim 5 wherein the composite is further cooled by bringing it to contact with a second surface at a temperature of −5° to −10° C.

7. An apparatus for making the composite defined in claim 1 which comprises:

supply means for delivering a plurality of fabric layers;

respective spreaders for depositing upon an upper surface of each of said fabric layers a respective coating of binder particles fusible to the respective fabric layer and to the other layers;

respective conveyors carrying the fabric layers coated with the binder particles along a path;

means forming a sintering chamber along said path at a temperature effecting bonding of the binder particles to the respective layers;

at least two pairs of pressing rollers each traversed by at least two of said layers coated with the binder particles and heated to press the layers together and bond them into said composite;

means for feeding at least one additional fabric layer between at least one of said pairs of pressing rollers to bond said additional layer to said composite;

cooling means having at least one cooling surface connected by said composite and disposed downstream of said pairs of pressing rollers; and means for coiling the cooled composite.

8. The apparatus defined in claim 7 wherein said chamber is provided with infrared radiation sources for at least one of said layers and heating tubes traversed by a heating fluid for another of said layers, the cooling surface being formed by at least one hollow cooling roll traversed by a cooling fluid.

9. The apparatus defined in claim 8, further comprising a cooling drum connected with a source of another cooling fluid at a temperature lower than that of the first cooling fluid.

10. The apparatus defined in claim 8 wherein the means for feeding said further layer includes a plurality of guide rollers, said guide rollers having at least a first guide roller and a last guide roller along a path of said further fabric formed with grooves running outwardly from the center of the respective roller to spread said further layer.

11. The apparatus defined in claim 10 wherein each of said spreaders includes a hopper converging toward a longitudinal slot extending the full width of the respective layer, a groove shaft rotatable at said slot and a reciprocating screen deposit beneath said slot.

* * * * *